May 29, 1945. J. D. JORG 2,377,238
THRESHING MACHINE
Filed July 17, 1942 2 Sheets-Sheet 1
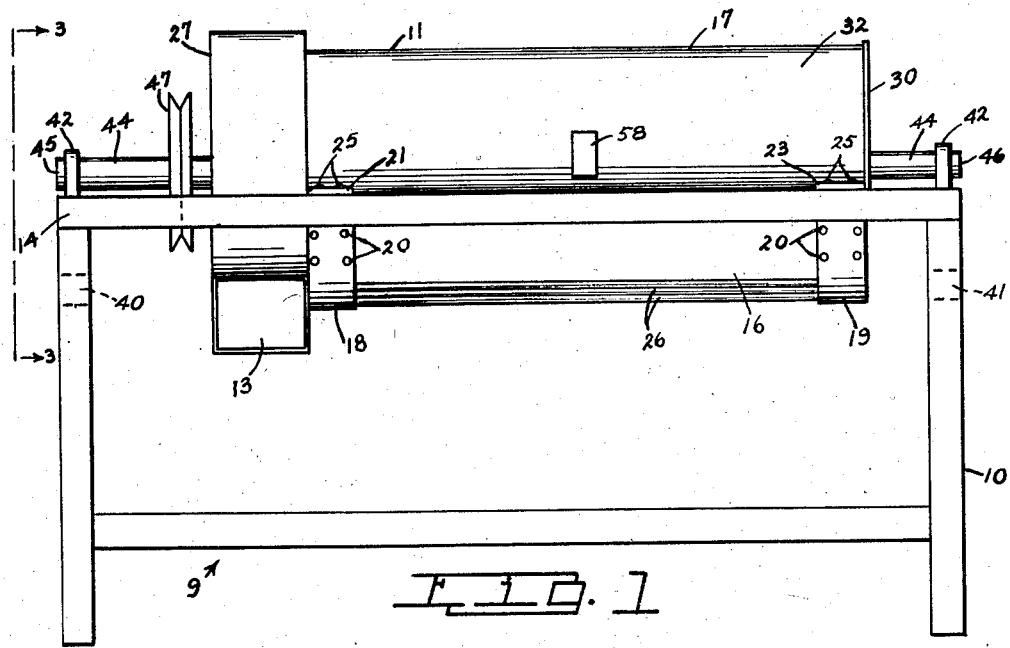
FIG. 1
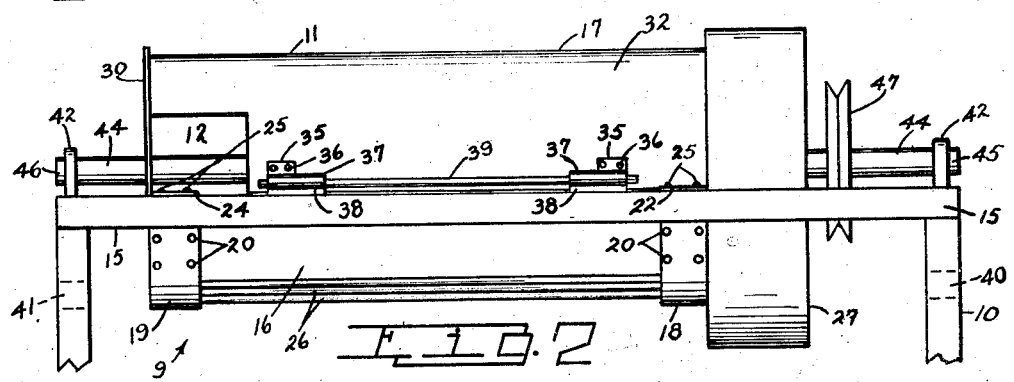
FIG. 2
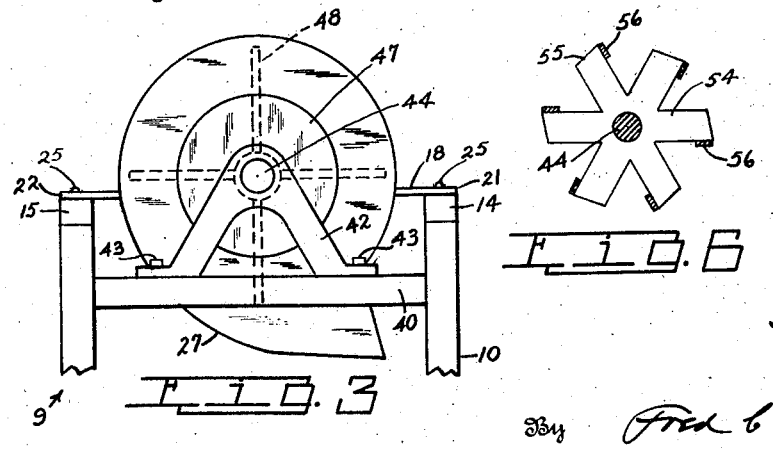
FIG. 3
FIG. 6
Inventor
JOHN D. JORG
By Fred C. Geiger
Attorney May 29, 1945.  J. D. JORG  2,377,238

THRESHING MACHINE

Filed July 17, 1942  2 Sheets-Sheet 2

Inventor
JOHN D. JORG

By Fred L. Geiger
Attorney

Patented May 29, 1945

2,377,238

UNITED STATES PATENT OFFICE 2,377,238

THRESHING MACHINE

John D. Jorg, St. Johns, Ohio

Application July 17, 1942, Serial No. 451,333

2 Claims. (Cl. 130—27)

The present invention relates to improvements in threshing machines.

The primary object of my invention is the provision of a device that threshes the grain from the straw and separates the straw from the grain in one cylinder.

Another object of my invention is the provision of means in the cylinder for governing the speed of the straw through the cylinder.

A still further object of the present invention is the provision of means in the cylinder allowing the separated grain to leave the cylinder.

A still further object of th epresent invention is the provision of a thresher in which the number of parts have been reduced to a minimum.

A still further object of the present invention is the provision of a thresher in which all of the moving parts are carried by a single shaft.

Other objects and advantages thereof will be clearly understood from a study of the following detailed description when read in conjunction with the attached drawings, wherein:

Figure 1 is a front elevational view of my improved thresher.

Figure 2 is a rear elevational view of Figure 1.

Figure 3 is an end elevational view taken on line 3—3 of Figure 1, and looking in the direction of the arrows, parts being shown fragmentarily.

Figure 6 is a section view taken on line 6—6 of Figure 4.

Figure 4:
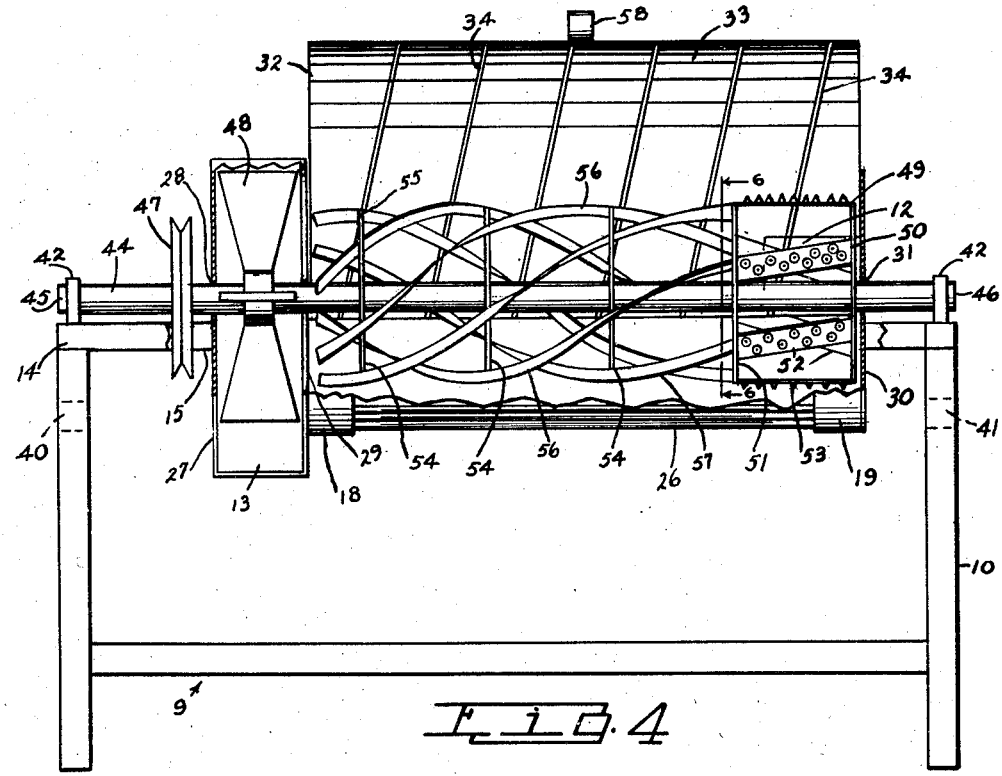
Figure 4 is a view similar to Figure 1, portions being shown fragmentarily and in section.
Figure 5:
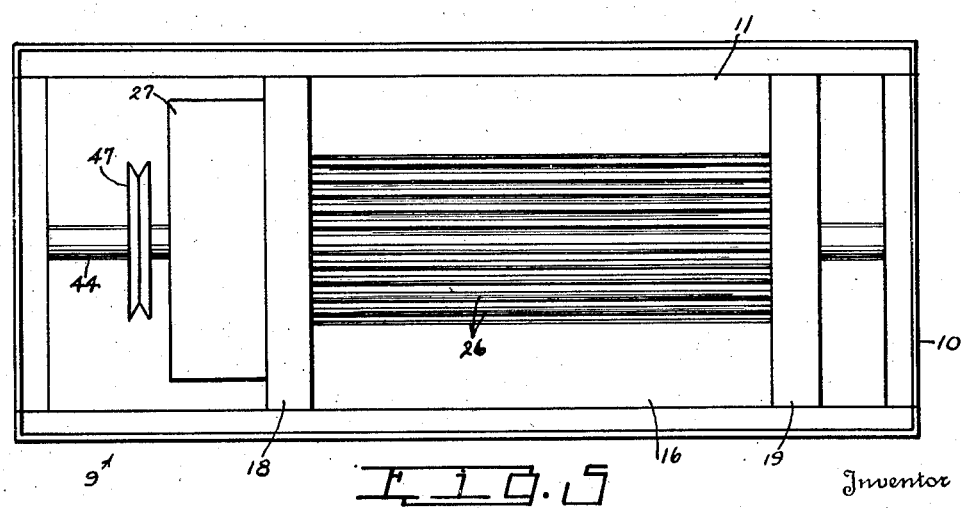
Figure 5 is a bottom plan view of my device and illustrating my novel bar grate.

Referring now to the drawings, the numeral 9 represents the thresher, and it comprises a frame 10, having a plurality of vertical, horizontal and transverse members, and a horizontal cylindrical housing 11, having an inlet opening 12 and a stalk discharge opening 13. The cylindrical housing 11 is interposed between the frame members 14 and 15, and it comprises a lower portion 16 and an upper portion 17. The lower portion 16 is supported by straps 18 and 19 that are rigidly secured to the lower portion by any suitable means, such as by rivets 20. The ends 21 and 22 of strap member 18, and 23 and 24 of strap member 19 are rigidly secured to the frame members 14 and 15 by any suitable means, such as by rivets 25. The lower portion 16 is provided with a grain discharge opening that comprises a plurality of rods 26 that are in spaced relation. Secured in any suitable manner to one end of the lower portion 16 is a volute housing 27 having an aperture 28 and an enlarged opening 29 for a purpose to be later described, the stalk discharge opening 13 being provided in the housing 27. To the opposite end of the lower housing 16 is secured in any suitable manner a disk 30 that forms an end wall for the housing 11 and it is provided with a central aperture 31.

The inlet opening 12 is provided in the lid 32, and on the inner peripheral wall 33 of the lid 32 are secured in any suitable manner a plurality of helical lunate members 34 that are in spaced relation. The lid 32 has hinge butts 35 that are secured to the lid by rivets 36. The butts 35 engage companion butts 37 that are secured by rivets 38 to the frame member 15. A rod member 39 connects the butts 35 and 37, providing a means for swinging movement of the lid 32. On transverse members 40 and 41 are bearing brackets 42 that are secured to the transverse members by bolts 43, the lid having a handle 58.

Within the housing 11 is a longitudinal coaxial shaft 44, the ends of which pass through apertures 28 and 31 the end portions 45 and 46 being seated in the bearing brackets 42. Mounted on the shaft 44 and secured thereto in the usual manner is a pulley wheel 47, and within the volute housing 27 and mounted on the shaft 44 and secured thereto in the usual manner is a fan 48. Also mounted on the shaft 44 adjacent the opening 12 is a thresher 49 that comprises finger disks 50 and 51 that are rigidly secured to the shaft in any suitable manner, strip metal members 52, the strip members being in spaced spiral relation, each strip being provided with studs 53, the ends of the strip members being connected to the disks 50 and 51 in any suitable manner. The shaft 44 also has mounted thereon a plurality of finger disks 54, one edge 55 of each of the fingers being disposed at an angle, the fingers of each disk being in staggered relation to the adjacent disk. To one edge of the finger disks 54 is secured one face of metal strips 56 as illustrated in Figure 6, the strips being positioned as illustrated in Figure 4 of the drawings, forming a reel 57, the strips being secured to the fingers in any suitable manner.

In the operation of my thresher, the pulley wheel 47 is connected with a source of suitable power (not shown), the pulley wheel rotating the shaft 44 and the members carried by the shaft. The material to be threshed is feed into the opening 12 where it is engaged by the thresher 49, the studs 53 threshing the grain from the straw. As the grain is threshed from the straw the grain sifts through the grain discharge opening 26, the straw or chaff is carried towards the volute housing 27 by the movement of the reel 57 which separates the grain from the straw, the straw impinging against the lunate members 34, and due to the angular position of the lunate members, the straw gradually feeds towards the volute housing 27, through the enlarged opening 29 where it is picked up by the fan 48 and discharged through the opening 13.

From the above description it can be seen that I have combined many operations in the threshing of grain into one structure, thus eliminating many moving parts, reducing the cost of the machine and threshing grain in a shorter time than is now required.

Having described my invention in detail, it will be obvious to those skilled in the art, that various changes and modifications may be made therein without departing from the spirit or scope of the appended claims.

What I claim is:

1. A thresher comprising a horizontal hollow cylinder having a lower portion, an upper portion and a housing adjacent one end thereof, the lower portion having supporting straps and a plurality of rods in spaced relation forming a grain discharge opening, the said upper portion having an intake opening and lunate bars on the inside thereof, said housing having a receiving opening in one side wall and a discharge opening, a shaft axially disposed in the cylinder and the housing, the ends of said shaft adapted for engagement with bearings, a plurality of finger discs mounted on said shaft, the fingers of some of said discs connected by diagonally disposed members forming a beater, said members having studs, the fingers of the other of said discs connected to metal strips forming a helical reel, the beater and reel being connected together and positioned in said cylinder, a fan on said shaft and disposed in said housing, the said lower and upper portions being hingedly connected.

2. A thresher comprising a frame having bearing brackets, a horizontal hollow cylinder having a lower portion, an upper portion and a housing in said frame, the lower portion having supporting straps and a plurality of rods in spaced relation forming a grain discharge opening, said upper portion having an intake opening and lunate bars on the inside thereof, said housing having a receiving opening in one side wall and a discharge opening, the ends of said straps being secured to said frame supporting said cylinder and housing in said frame, the said lower and upper portions being hingedly connected, a shaft axially disposed in said cylinder and housing, the ends of said shaft engaging said bearing brackets, a spiral beater, a helical reel and a fan carried by said shaft, said spiral beater and helical reel disposed in said cylinder, the said fan housing in said housing.

JOHN D. JORG.